US010054008B2

(12) United States Patent
Bettagere et al.

(10) Patent No.: US 10,054,008 B2
(45) Date of Patent: Aug. 21, 2018

(54) TURBOMACHINE ACCESSORY GEARBOX BRACKET

(71) Applicant: United Technologies Corporation, Hartford, CT (US)

(72) Inventors: Lakshminarayan S. Bettagere, Farmington, CT (US); Keven Van Duyn, Bloomfield, CT (US); Mark R. Sondeen, West Hartford, CT (US); Jonathan F. Zimmitti, Newington, CT (US)

(73) Assignee: United Technologies Corporation, Farmington, CT (US)

( * ) Notice: Subject to any disclaimer, the term of this patent is extended or adjusted under 35 U.S.C. 154(b) by 556 days.

(21) Appl. No.: 14/617,163

(22) Filed: Feb. 9, 2015

(65) Prior Publication Data

US 2016/0230600 A1     Aug. 11, 2016

(51) Int. Cl.
*F01D 25/28* (2006.01)
*F01D 15/12* (2006.01)
*F16H 57/02* (2012.01)
*F02C 7/32* (2006.01)

(52) U.S. Cl.
CPC ............. *F01D 25/28* (2013.01); *F01D 15/12* (2013.01); *F02C 7/32* (2013.01); *F16H 57/02* (2013.01); *F05D 2230/31* (2013.01); *F05D 2230/312* (2013.01); *F05D 2230/90* (2013.01); *F05D 2240/90* (2013.01); *F05D 2260/30* (2013.01); *F05D 2260/4031* (2013.01); *F05D 2260/96* (2013.01); *F05D 2300/6111* (2013.01); *F16H 2057/02039* (2013.01)

(58) Field of Classification Search
CPC . F01D 25/28; F01D 15/12; F02C 7/32; F16H 57/02; F16H 2057/02039; F05D 2260/30; F05D 2260/96; F05D 2260/4031; F05D 2300/6111; F05D 2300/31; F05D 2240/90; F05D 2230/90; F05D 2230/312
See application file for complete search history.

(56) References Cited

U.S. PATENT DOCUMENTS

| 5,435,124 | A | 7/1995 | Sadil et al. |
| 6,170,252 | B1 | 1/2001 | Van Duyn |
| 6,226,978 | B1* | 5/2001 | Chandra ............... C23C 28/325 60/805 |
| 6,357,220 | B1 | 3/2002 | Snyder et al. |
| 8,104,736 | B2* | 1/2012 | Callaghan ............ F01D 21/045 248/300 |
| 8,561,501 | B2 | 10/2013 | Niggemeier et al. |
| 9,080,463 | B2* | 7/2015 | Denece .................... F01D 9/04 |
| 2011/0296847 | A1* | 12/2011 | Williams ............... B21D 53/50 60/796 |
| 2012/0317991 | A1* | 12/2012 | Frost ......................... F02C 7/32 60/784 |

(Continued)

FOREIGN PATENT DOCUMENTS

| CN | 103233216 | 8/2013 |
| WO | 2014137575 | 9/2014 |

*Primary Examiner* — Ian Paquette
(74) *Attorney, Agent, or Firm* — Carlson, Gaskey & Olds, P.C.

(57) ABSTRACT

A gearbox assembly includes a housing structure, a shear bracket that connects the housing structure to a hanger to hold the housing structure relative to a turbomachine, and a thermal spray layer between the shear bracket and the housing structure.

20 Claims, 8 Drawing Sheets

(56) References Cited

U.S. PATENT DOCUMENTS

2013/0323473 A1* 12/2013 Dietsch .............. B29C 67/0055
                                                     428/174
2014/0314546 A1* 10/2014 Davis .................... F01D 21/045
                                                     415/124.1
2015/0128592 A1*  5/2015 Filiputti ................. F02C 7/272
                                                     60/632

* cited by examiner

TURBOMACHINE ACCESSORY GEARBOX BRACKET

TECHNICAL FIELD

This disclosure relates generally to an accessory gearbox and, more particularly, to mounting the accessory gearbox to a turbomachine.

BACKGROUND

Turbomachines, such as gas turbine engines, typically include a compression section, a combustion section, and a turbine section. Turbomachines often include an accessory gearbox that is utilized to rotatably drive various accessories. The accessory gearbox may incorporate a starter for the turbomachine.

Many accessory gearboxes mount directly to a case of the turbomachine. A tower shaft rotatably couples the accessory gearbox to the turbomachine. Mounting the accessory gearbox may be difficult due to, among other things, vibrations of the accessory gearbox.

Some land-based turbomachines use accessory gearboxes that are heavier than the accessory gearboxes used for turbomachines that propel aircraft. The heavier accessory gearboxes can further complicate mounting.

SUMMARY

A gearbox assembly according to an exemplary aspect of the present disclosure includes, among other things, a housing structure, a shear bracket that connects the housing structure to a hanger to hold the housing structure relative to a turbomachine, and a thermal spray layer between the shear bracket and the housing structure.

In a further non-limiting embodiment of the foregoing assembly, a portion of the shear bracket is coated in the thermal spray layer.

In a further non-limiting embodiment of any of the foregoing assemblies, the shear bracket interfaces with the housing structure through the portion.

In a further non-limiting embodiment of any of the foregoing assemblies, the housing structure and the shear bracket interface with each other through the thermal spray layer.

In a further non-limiting embodiment of any of the foregoing assemblies, the thermal spray layer is planar and lacks serrations.

In a further non-limiting embodiment of any of the foregoing assemblies, the assembly includes a plurality of mechanical fasteners that secure the shear bracket to the housing structure.

In a further non-limiting embodiment of any of the foregoing assemblies, the thermal spray comprises nickel and aluminum composite particles.

In a further non-limiting embodiment of any of the foregoing assemblies, the turbomachine is a land-based turbomachine.

In a further non-limiting embodiment of any of the foregoing assemblies, the assembly includes a gear train housed within the housing structure and a starter secured to the housing structure.

In a further non-limiting embodiment of any of the foregoing assemblies, the starter is a hydraulic starter.

In a further non-limiting embodiment of any of the foregoing assemblies, the thermal spray layer is a plasma spray layer.

A turbomachine assembly according to an exemplary aspect of the present disclosure includes, among other things, a turbomachine engine, a housing structure, a gear train within the housing structure that is selectively driven by the turbomachine, a starter within the housing structure that selectively drives the turbomachine, and a shear bracket connecting a flange of the housing structure to a hanger of the turbomachine engine. The shear bracket interfaces with the flange through a plasma spray coating.

In a further non-limiting embodiment of the foregoing assembly, the shear bracket includes the plasma spray coating.

In a further non-limiting embodiment of any of the foregoing assemblies, the shear bracket is fastened to the flange.

A method of limiting relative movement between a housing structure and a shear bracket includes, among other things, coating a housing structure surface, a shear bracket surface, or both with a plasma spray layer. The method further includes securing a housing structure and a shear bracket relative to each other through the plasma spray layer.

In a further non-limiting embodiment of the foregoing method, a portion of the shear bracket is coated in the plasma spray layer.

In a further non-limiting embodiment of any of the foregoing methods, the securing includes fastening the housing structure to the shear bracket using at least one mechanical fastener.

In a further non-limiting embodiment of any of the foregoing methods, the method further includes securing the shear bracket to a hanger that is secured relative to a turbomachine.

In a further non-limiting embodiment of any of the foregoing methods, the turbomachine is a land-based turbomachine.

In a further non-limiting embodiment of any of the foregoing methods, the plasma spray includes nickel and aluminum composite particles.

In a further non-limiting embodiment of any of the foregoing methods, the method further includes housing a gear train within the housing structure.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

BRIEF DESCRIPTION OF THE DRAWINGS

The various features and advantages of the disclosed examples will become apparent to those skilled in the art from the detailed description. The figures that accompany the detailed description can be briefly described as follows.

DETAILED DESCRIPTION

Figure 1:
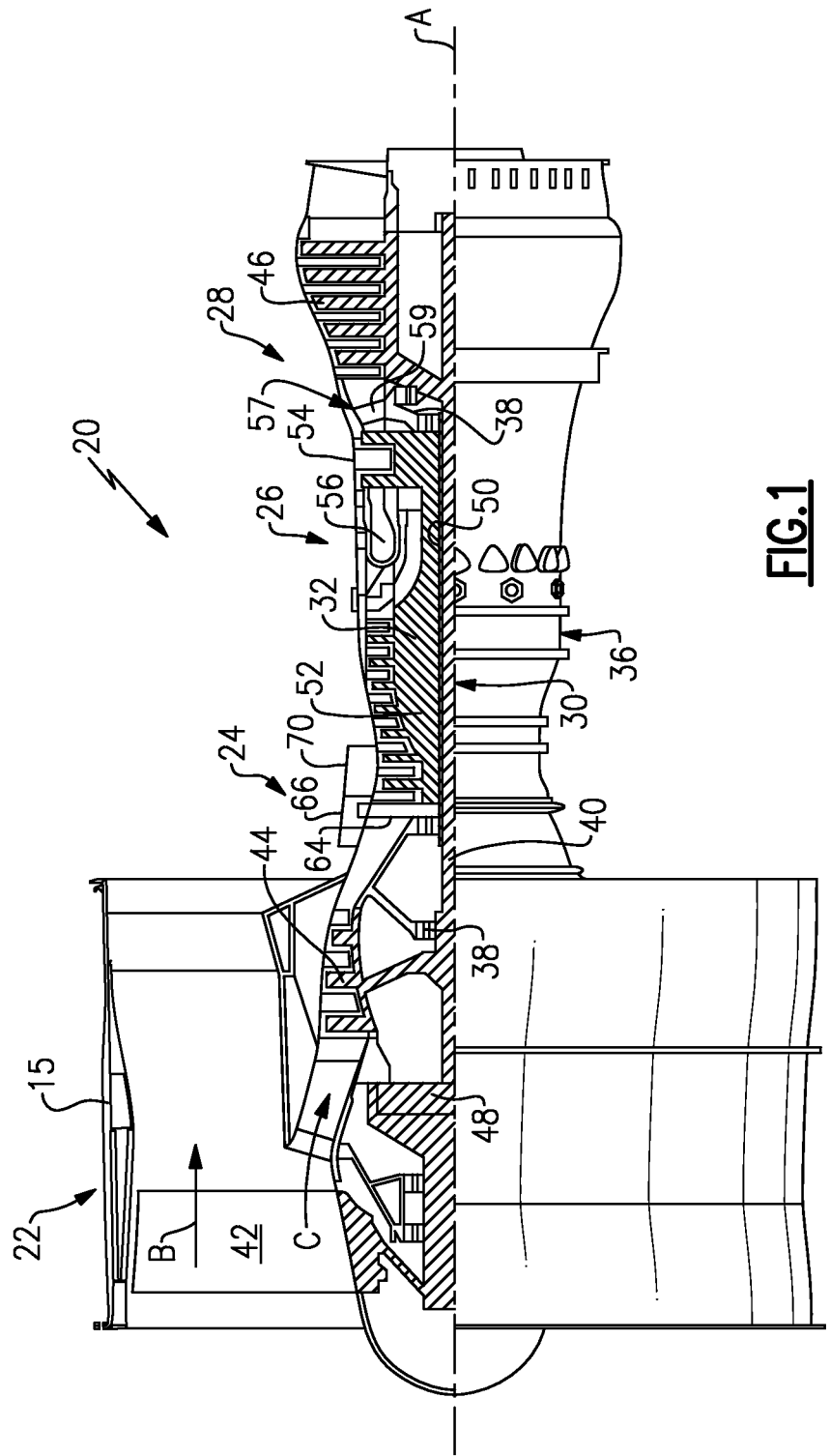
FIG. 1 shows a section view of an example turbomachine.

FIG. 1 schematically illustrates a gas turbine engine 20, which is an example turbomachine. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high-pressure compressor 52 and the high-pressure turbine 54. A mid-turbine frame 57 of the engine static structure 36 is arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 feet/second (350.5 meters/second).

Not all power generated by gas turbine engines is used by the engine for propulsion or for engine accessories. Typically, some of the power generated by gas turbine engines is siphoned off and used to power non-engine accessory systems of an associated aircraft. Example non-engine accessory systems include environmental control systems and electrical systems of the aircraft.

Power from gas turbine engines that is used for the non-engine accessory systems is often referred to as "off-take power." The off-take power is in addition to the power generated by the engine that provides propulsive thrust. The off-take power is also in addition to the power required to drive engine oil pumps, engine generators, or other engine operating systems.

The engine 20 includes a tower shaft 64 selectively driven by the outer shaft 50 of the high speed spool 32. The tower shaft 64 provides a rotating input to an accessory gearbox 66 that in turn drives an accessory generator 70 to provide off-take power from the engine 20. The off-take power from the accessory generator 70 may be used to power aircraft systems, such as the environmental control systems and electrical systems of the gas turbine engine 20.

The gearbox 66 is mounted to a case of the high-pressure compressor 52 in this example.

Figure 2:
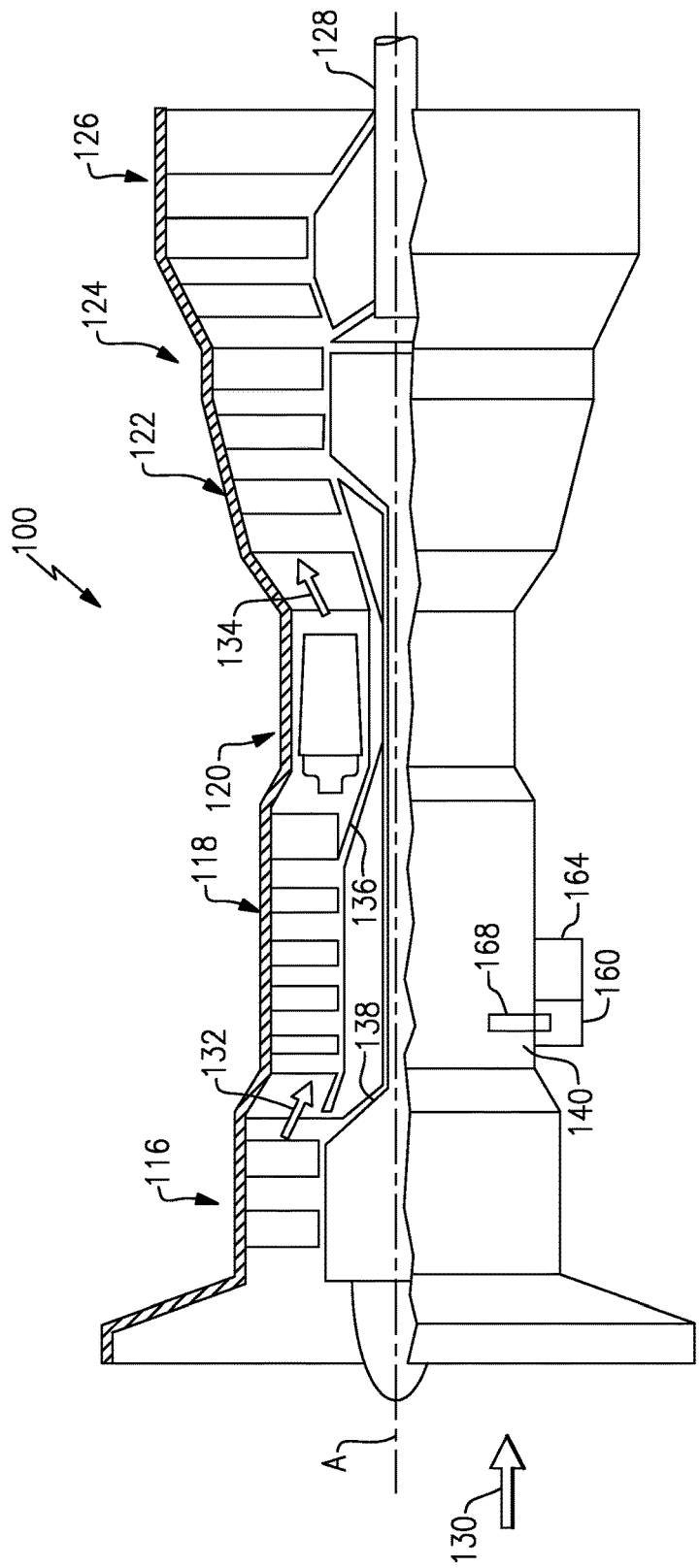
FIG. 2 shows a section view of another example turbomachine.
Figure 3:
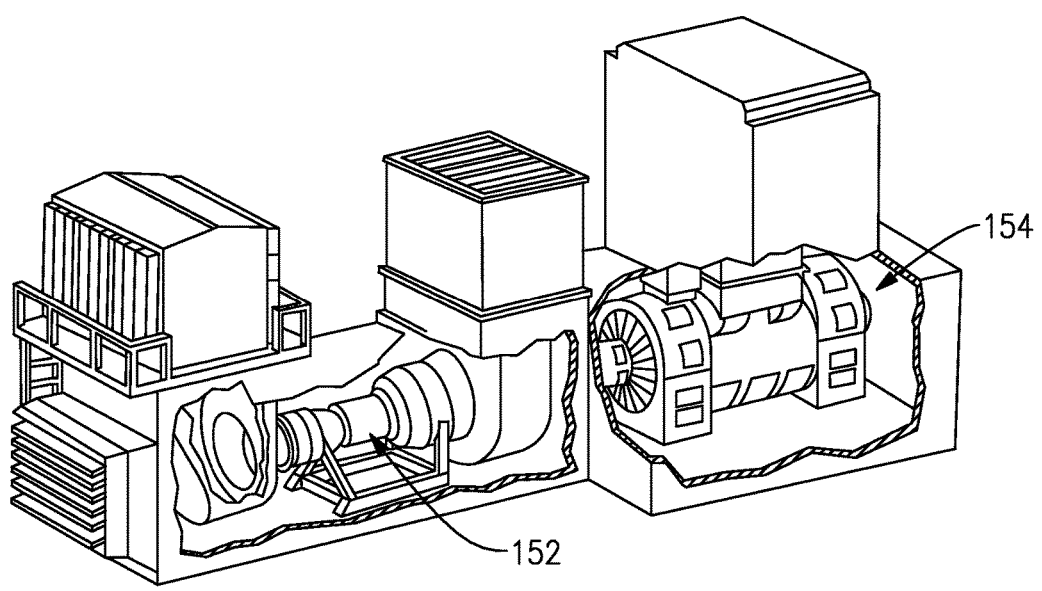
FIG. 3 shows the turbomachine of FIG. 2 with a generator.
Figure 4:
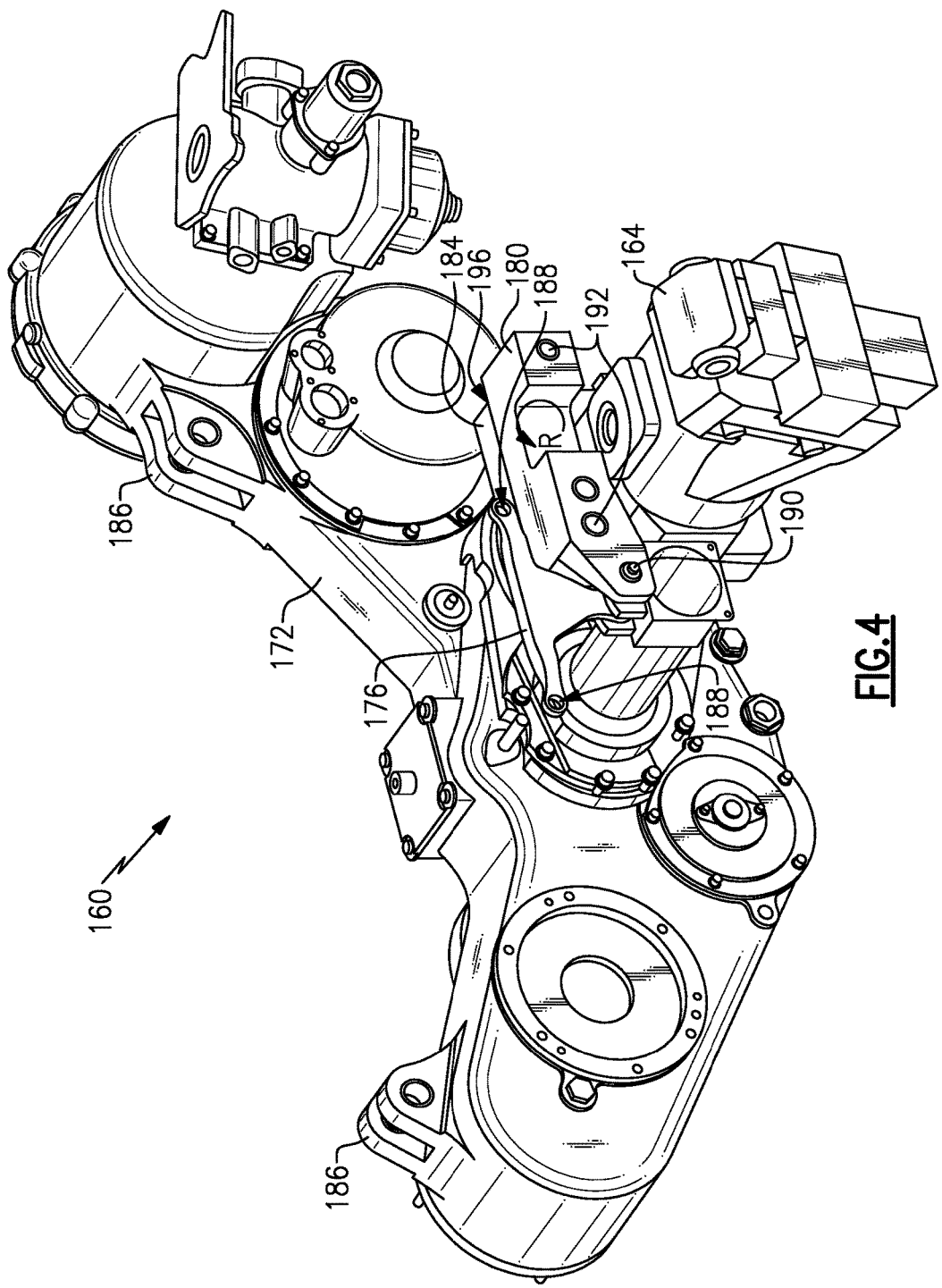
FIG. 4 shows a perspective view of an accessory gearbox for use with the turbomachine of FIG. 2.
Figure 5:
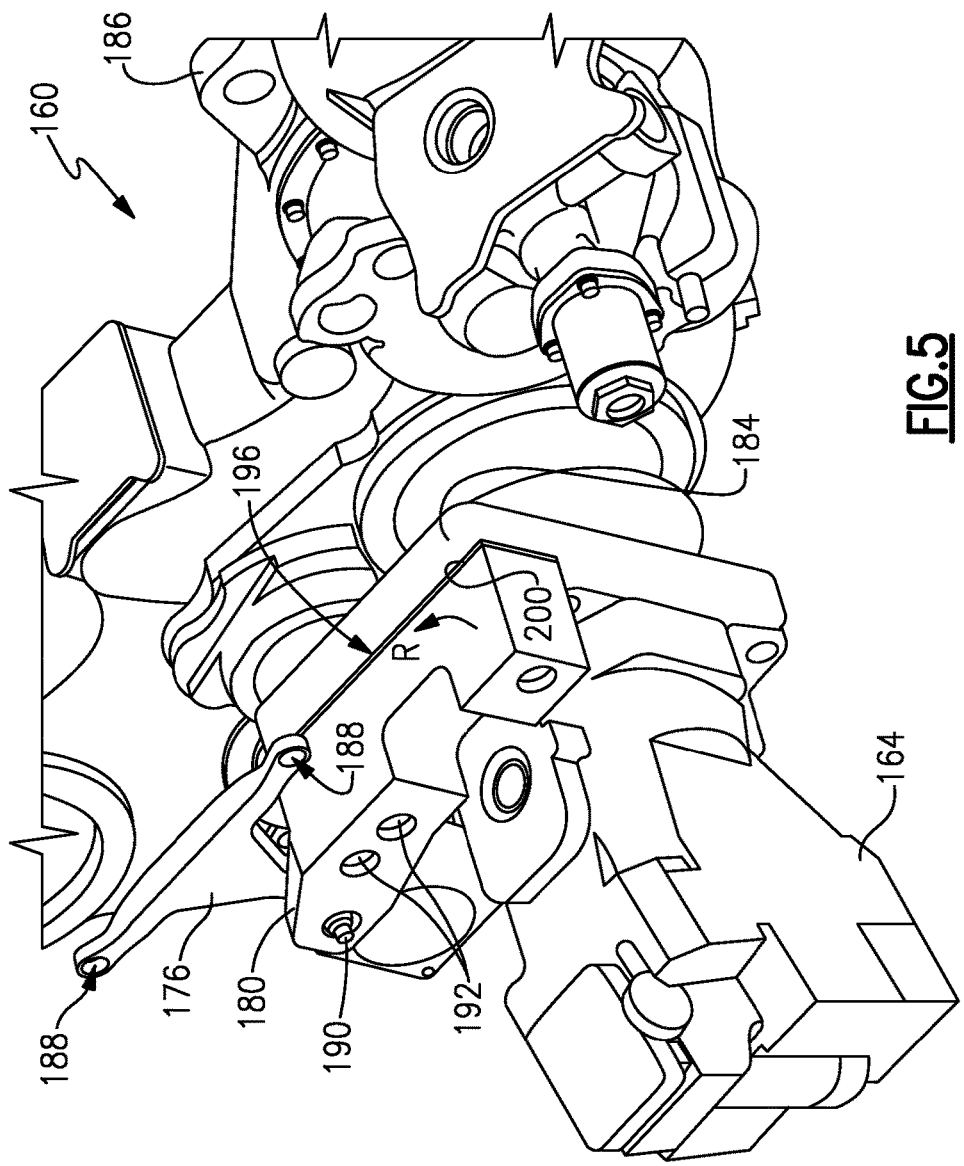
FIG. 5 shows a perspective view of a portion of the accessory gearbox of FIG. 4.
Figure 6:
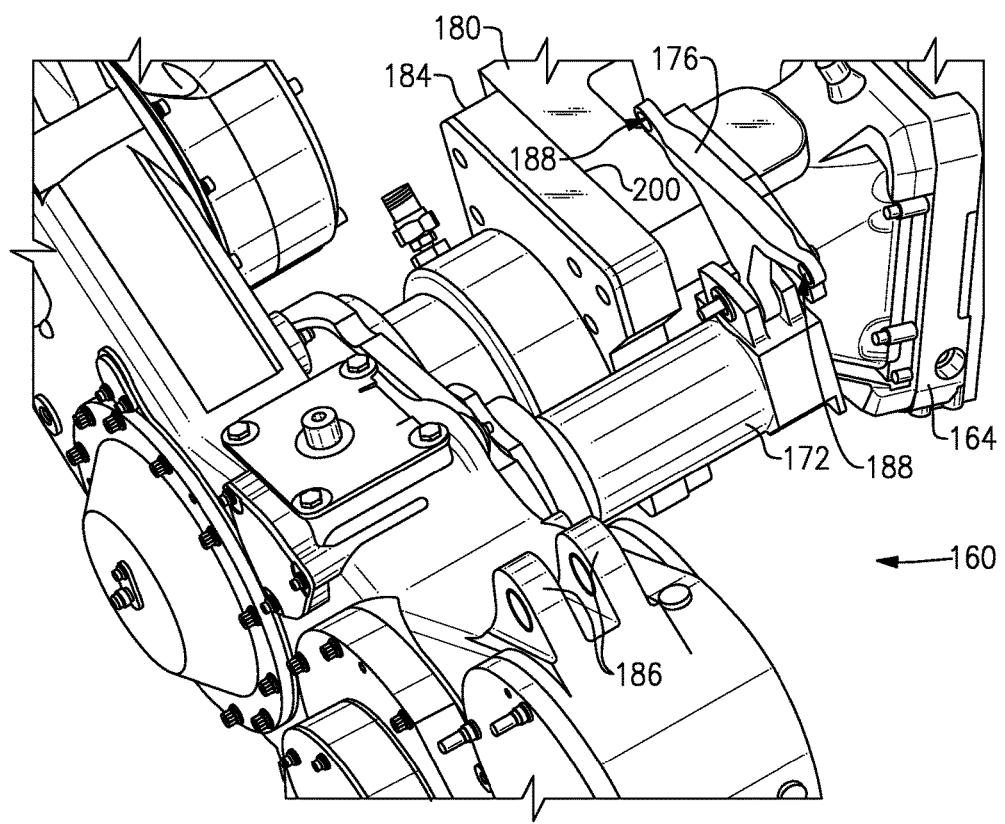
FIG. 6 shows a perspective view of another portion of the accessory gearbox of FIG. 4.
Figure 7:
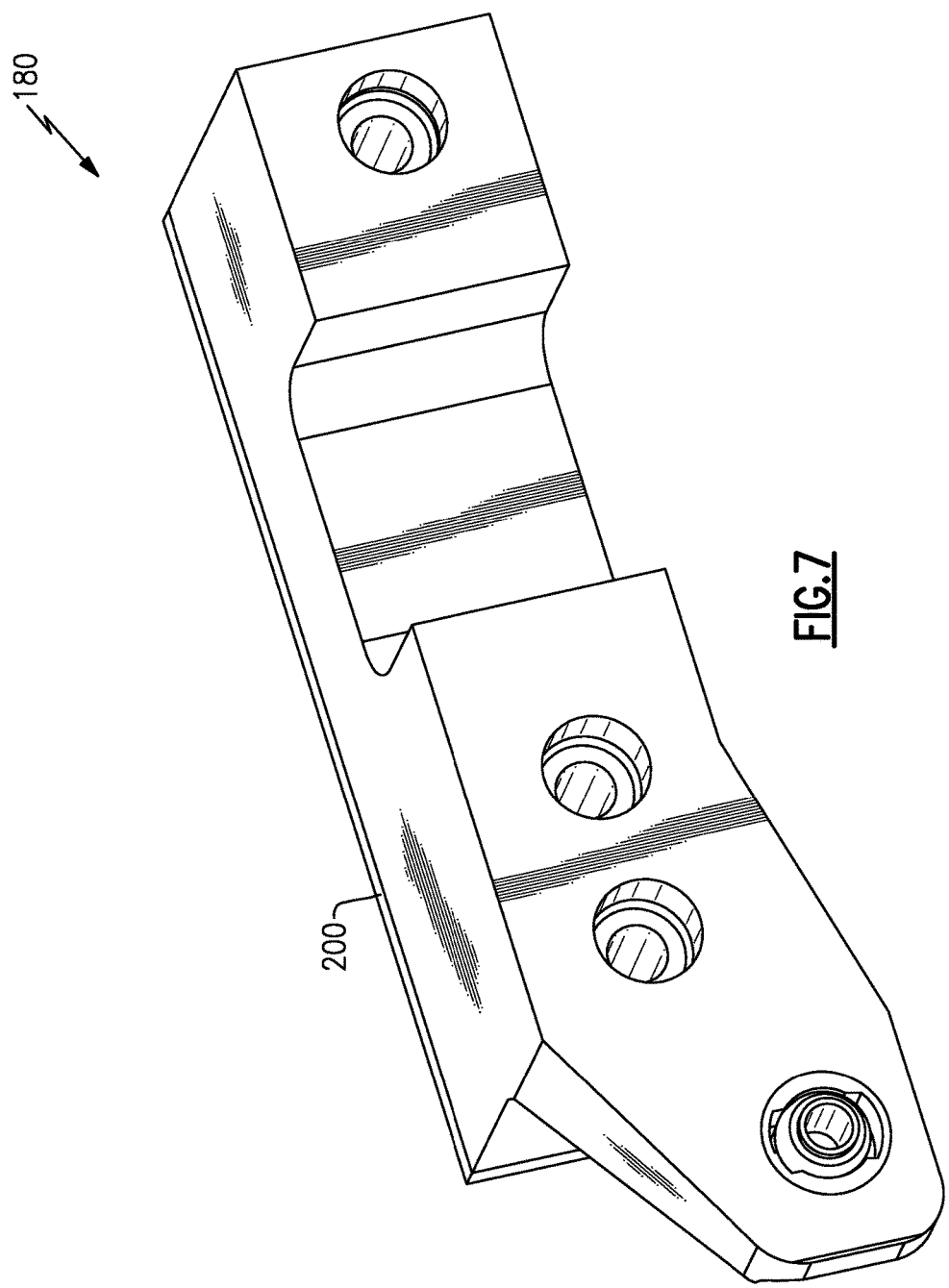
FIG. 7 shows a perspective view of an example shear bracket used in connection with mounting the accessory gearbox of FIG. 4.
Figure 8:
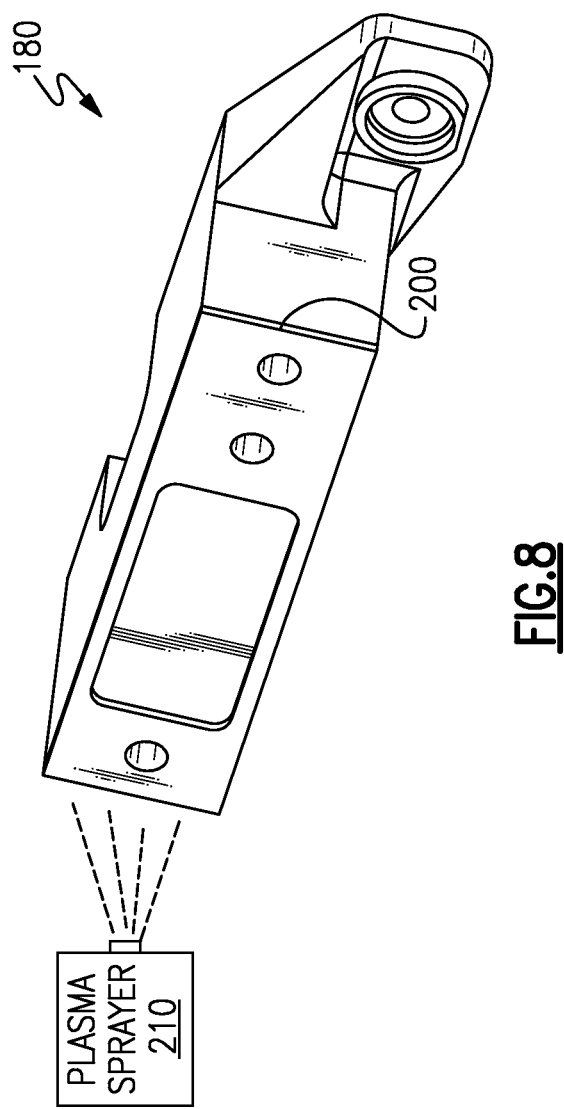
FIG. 8 shows another perspective view of the shear bracket of FIG. 7.

Referring now to FIGS. 2 and 3 with continuing reference to FIG. 1, a gas turbine engine 100 is an industrial gas turbine engine circumferentially disposed about a central, longitudinal engine axis A'. In this disclosure, radial or radial direction is relative to the engine axis unless specified otherwise.

The gas turbine engine 100 includes, in series order from an axial front to an axial rear, a low-pressure compressor section 116, a high-pressure compressor section 118, a combustor section 120, a high-pressure turbine section 122, and a low-pressure turbine section 124. In the illustrated embodiment, a power turbine section 126 is a free turbine section disposed aft of the low-pressure turbine 124. The power turbine section 126 drives a power turbine drive shaft 128.

Ambient air 130 entering the gas turbine engine 100 becomes pressurized air 132 in the low-pressure compressor 116 and the high-pressure compressor 118. Fuel mixes with pressurized air 132 in the combustor section 120 prior to ignition and combustion of the fuel. Once the fuel has combusted, combustion gases 134 expand through the high-pressure turbine section 122, the low-pressure turbine section 124, and through the power turbine section 126. The high and low-pressure turbine sections 122 and 124 drive high and low-pressure rotor shafts 136 and 138, respectively, which rotate in response to the combustion products and thus rotate the attached high and low-pressure compressor sections 118 and 116. The power turbine section 126 may, for example, drive an electrical generator 154, pump, or gearbox through the power turbine drive shaft 128.

A high-pressure compressor exhaust case 140 is positioned between the low-pressure compressor 116 and the combustor section 120. The case 140 generally defines an outer boundary of a flow path through the high-pressure compressor. The case 140 also provides structural support for the gas turbine engine 100.

An accessory gearbox 160 is mounted to the case 140. The accessory gearbox 160 incorporates a starter 164. A tower shaft 168 extends from the shaft 138 to rotatably interface with the gearbox 160. The starter 164 rotates the rotor shafts 136 and 138 through the tower shaft 168 when starting the gas turbine engine 100. The starter 164 is a hydraulic starter in this example. The starter 164 can be used to mechanically windmill the gas turbine engine 100 during a cool-down procedure, for example.

When the gas turbine engine 100 reaches speed, such as a self-sustaining rotational speed, the tower shaft 168 is rotated by the gas turbine engine 100 to provide a rotational input to the accessory gearbox 160. The accessory gearbox 160 then powers accessories of the gas turbine engine 100, such as hydraulic pumps, lubricant pumps, vane actuators, etc.

Notably, in this example, the gearbox 160 associated with the land-based gas turbine engine 100 is bulkier and heavier than the accessory gearbox 160 associated with the propulsion engine 20.

Referring now to FIGS. 4 to 8 with continuing reference to FIGS. 2 and 3, the example accessory gearbox 160 includes a housing structure 172. The starter 164 and a gear train are housed within the housing structure 172.

The accessory gearbox 160 is at least partially supported relative to the case 140 through a hanger 176, a shear bracket 180, and a housing flange 184. Other portions of the housing structure 172 may include additional flanges 186 having apertures that receive fasteners to secure the accessory gearbox 160 relative to the case 140.

Bolts (not shown) extend through apertures 188 in the hanger 176 to secure the hanger 176 to the case 140.

A pin 190 couples the hanger 176 to the housing 172 and the shear bracket 180. The shear bracket 180 is bolted directly to the flange 184 via bolts 192 such that the shear bracket 180 directly contacts the flange 184 along an interface 196. The bolts 192 are configured to apply a relatively large clamp load to the shear bracket 180 and the flange 184. Washers could be used with the bolts to facilitate attachment.

Diameters of some of the bolts 192 may be undersized relative to diameters of the apertures in one of the shear bracket 180 or the flange 184 so that the shear bracket 180 and flange 184 may accommodate some tolerances during assembly. One of the bolts 192 or the pin 190 may not be undersized and may be used to locate the shear bracket 180 to the flange 184 during assembly.

Operating the gas turbine engine 100 can introduce loads to the flange 84 and the shear bracket 180. This can prompt movement of the flange 84 relative to the shear bracket 180 in a direction R, or vice versa. Further, during operation, the flange 184 may vibrate relative to the shear bracket 180.

Relative movement between the flange 184 and the shear bracket 180 is typically not desired. The accessory gearbox 160 thus includes a coating 200 on a surface of the shear bracket 180, a surface of the flange 184, or both, at the interface 196. The coating 200 increases friction between the shear bracket 180 and the flange 184 at the interface 196. The friction resists relative movement between the flange 184 (and the remaining portions of the housing 172) and the shear bracket 180.

Previously, serrations had been machined in the shear bracket 180, the flange 184, or both near the interface. The serrations increase friction between the shear bracket 180 and the flange 184. The example coating 200 is used in place of serrations in the shear bracket 180, the flange 184, or both. The coating 200 provides frictional increases without machining serrations. The coating 200 could, however, be used together with serrations.

In this example, the coating 200 is applied in a thermal spray process, such as a plasma spray applied to surfaces of the shear bracket 180 by a plasma sprayer 210. The plasma sprayer 210 applied directs a spray of molten material toward surfaces of the shear bracket 180. The molten metallic material hardens and adheres to the shear bracket 180.

The coating 200 is a hard material relative to the material of the flange 184. When forces attempt to induce relative movement between the shear bracket 180 and the flange 184, the relatively hard coating 200 bites into the relatively soft material of the flange 184 and opposes these forces. The relatively soft material of the flange 184 is imprintable.

The example coating is a nickel and aluminum composite particulate spray. Other types of plasma spray could be used in other examples.

Other than the coating 200, the shear bracket 180 is an aluminum alloy material, although other materials could be used. The housing 172, which includes the flange 184 are also an aluminum alloy, although other materials could be used.

The sprayed surfaces of the shear bracket 180 are only near the interface 196 in this example. In another example, the coating 200 covers substantially all of the outwardly facing surfaces of the shear bracket 180.

In still other examples, the coating 200 could instead be applied to the flange 184, or to both the flange 184 and the shear bracket 180.

Features of the disclosed examples include coating an interfacing surface between a bracket and a housing structure with a thermal or plasma spray to increase friction between the bracket and the housing structure and resist relative movement. In some examples, a coating has been shown to increase sliding resistance between the bracket and the flange by a factor of 2.5.

The coating can take the place of serrations, which can be costly and can cause alignment issues. The coating increases friction at the interface between the flange and shear bracket without introducing alignment issues.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

Although embodiments of this invention have been disclosed, a worker of ordinary skill in the art would recognize that certain modifications would come within the scope of this invention. For that reason, the following claims should be studied to determine the true scope and content of this invention.

We claim:

1. A gearbox assembly, comprising
   a housing structure;
   a shear bracket that connects the housing structure to a hanger to hold the housing structure relative to a turbomachine; and
   a thermal spray layer between the shear bracket and the housing structure.

2. The gearbox assembly of claim 1, wherein the housing structure and the shear bracket interface with each other through the thermal spray layer.

3. The gearbox assembly of claim 1, wherein the thermal spray layer is planar and lacks serrations.

4. The gearbox assembly of claim 1, wherein the thermal spray comprises nickel and aluminum composite particles.

5. The gearbox assembly of claim 1, wherein the turbomachine is an industrial land-based turbomachine.

6. The gearbox assembly of claim 1, including a gear train housed within the housing structure and a starter secured to the housing structure.

7. The gearbox assembly of claim 1, wherein the thermal spray layer is a plasma spray layer.

8. The gearbox assembly of claim 1, wherein a portion of the shear bracket is coated in the thermal spray layer.

9. The gearbox assembly of claim 8, wherein the shear bracket interfaces with the housing structure through the portion.

10. The gearbox assembly of claim 1, including a plurality of mechanical fasteners that secure the shear bracket to the housing structure.

11. The gearbox assembly of claim 10, wherein the starter is a hydraulic starter.

12. A turbomachine assembly, comprising:
    a turbomachine engine;
    a housing structure;
    a gear train within the housing structure that is selectively driven by the turbomachine;
    a starter within the housing structure that selectively drives the turbomachine; and
    a shear bracket connecting a flange of the housing structure to a hanger of the turbomachine engine, the shear bracket interfacing with the flange through a plasma spray coating.

13. The turbomachine assembly of claim 12, wherein the shear bracket includes the plasma spray coating.

14. The turbomachine assembly of claim 12, wherein the shear bracket is fastened to the flange.

15. A method of limiting relative movement between a housing structure and a shear bracket, comprising:
    coating a housing structure surface, a shear bracket surface, or both with a plasma spray layer; and
    securing the housing structure and the shear bracket relative to each other through the plasma spray layer.

16. The method of claim 15, wherein a portion of the shear bracket is coated in the plasma spray layer.

17. The method of claim 15, wherein the securing comprising fastening the housing structure to the shear bracket using at least one mechanical fastener.

18. The method of claim 15, further comprising securing the shear bracket to a hanger that is secured relative to a turbomachine.

19. The method of claim 15, wherein the turbomachine is an industrial land-based turbomachine.

20. The method of claim 15, wherein the plasma spray comprises nickel and aluminum composite particles.

* * * * *

UNITED STATES PATENT AND TRADEMARK OFFICE
CERTIFICATE OF CORRECTION

PATENT NO. : 10,054,008 B2
APPLICATION NO. : 14/617163
DATED : August 21, 2018
INVENTOR(S) : Lakshminarayan S. Bettagere et al.

Page 1 of 1

It is certified that error appears in the above-identified patent and that said Letters Patent is hereby corrected as shown below:

In the Claims

In Claim 4, Column 7, Line 38-39; replace "the thermal spray" with --the thermal spray layer--

In Claim 11, Column 8, Line 9; replace "claim 10" with --claim 6--

Signed and Sealed this
First Day of February, 2022

Drew Hirshfeld
*Performing the Functions and Duties of the
Under Secretary of Commerce for Intellectual Property and
Director of the United States Patent and Trademark Office*